United States Patent
Choe et al.

(10) Patent No.: US 12,550,202 B2
(45) Date of Patent: Feb. 10, 2026

(54) METHOD AND APPARATUS FOR A CELL SELECTION OR A CELL RESELECTION CONSIDERING A NETWORK SLICE IN A WIRELESS COMMUNICATION SYSTEM

(71) Applicant: LG Electronics Inc., Seoul (KR)

(72) Inventors: Hyunjung Choe, Seoul (KR); Seungjune Yi, Seoul (KR); Sunghoon Jung, Seoul (KR); Sangwon Kim, Seoul (KR); Hongsuk Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 483 days.

(21) Appl. No.: 18/009,868

(22) PCT Filed: Jul. 13, 2021

(86) PCT No.: PCT/KR2021/008965
§ 371 (c)(1),
(2) Date: Dec. 12, 2022

(87) PCT Pub. No.: WO2022/015014
PCT Pub. Date: Jan. 20, 2022

(65) Prior Publication Data
US 2023/0247685 A1 Aug. 3, 2023

(30) Foreign Application Priority Data
Jul. 13, 2020 (KR) .......................... 10-2020-0086243

(51) Int. Cl.
*H04W 76/10* (2018.01)
*H04W 36/06* (2009.01)
*H04W 48/18* (2009.01)

(52) U.S. Cl.
CPC .......... *H04W 76/10* (2018.02); *H04W 36/06* (2013.01); *H04W 48/18* (2013.01)

(58) Field of Classification Search
CPC ...... H04W 76/10; H04W 36/06; H04W 48/18
See application file for complete search history.

(56) References Cited

U.S. PATENT DOCUMENTS

2018/0270713 A1* 9/2018 Park ...................... H04L 5/0053
2019/0364541 A1 11/2019 Ryu

FOREIGN PATENT DOCUMENTS

KR     2018004 7172     5/2018

OTHER PUBLICATIONS

3GPP, "3rd Generation Partnership Project; Technical Specification Group Radio Access Network; NR; NR and NG-RAN Overall Description; Stage 2 (Release 16)," TS 38.300 V16.1.0, Mar. 2020, 133 pages.

(Continued)

*Primary Examiner* — Sulaiman Nooristany
(74) *Attorney, Agent, or Firm* — Fish & Richardson P.C.

(57) ABSTRACT

A method and apparatus for a cell selection or a cell reselection considering a network slice in a wireless communication system is described. A wireless device configures multiple network slices. A wireless device receives a network slice information related to the multiple network slices. A wireless device establishes a PDU session for a specific service. A wireless device determines one or more frequencies that support the at least one network slice, used by the PDU session, from among the multiple network slices based on the frequency information. A wireless device performs a cell selection procedure and/or a cell reselection procedure based on the determined one or more frequencies.

15 Claims, 16 Drawing Sheets

(56) References Cited

OTHER PUBLICATIONS

3GPP, "3rd Generation Partnership Project; Technical Specification Group Services and System Aspects; Procedures for the 5G System (5GS); Stage 2 (Release 16)," TS 23.502 V16.5.0, Jul. 2020, 594 pages.
3GPP, "3rd Generation Partnership Project; Technical Specification Group Services and System Aspects; Study on enhancement of network slicing; Phase 2 (Release 17)," TR 23.700-40 V0.4.0, Jun. 2020, 143 pages.
3GPP, "3rd Generation Partnership Project; Technical Specification Group Services and System Aspects; System architecture for the 5G System (5GS); Stage 2 (Release 16)," TS 23.501 V16.5.0, Jul. 2020, 442 pages.
3GPP, "3rd Generation Partnership Project; Technical Specification Group Radio Access Network; NR; User Equipment (UE) procedures in Idle mode and RRC Inactive state (Release 16)," TS 38.304 V16.0.0, Mar. 2020,.

\* cited by examiner

METHOD AND APPARATUS FOR A CELL SELECTION OR A CELL RESELECTION CONSIDERING A NETWORK SLICE IN A WIRELESS COMMUNICATION SYSTEM

CROSS-REFERENCE TO RELATED APPLICATIONS

This application is a National Stage application under 35 U.S.C. § 371 of International Application No. PCT/KR2021/008965, filed on Jul. 13, 2021, which claims the benefit of Korean Patent Application No. 10-2020-0086243, filed on Jul. 13, 2020. The disclosures of the prior applications are incorporated by reference in their entirety.

TECHNICAL FIELD

The present disclosure relates to a method and apparatus for a cell selection or a cell reselection considering a network slice in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In NR, a radio frequency may be associated with a particular network slice. A particular service associated with the particular network slice may be provided via the associated radio frequency.

The network slice information may need to be considered when a User Equipment (UE) selects a suitable or better cell. If UE does not consider the network slice and perform the cell (re)selection procedure based on only frequency priority and cell quality, the UE may not be able to support service continuity, since a new cell does not support the network slice that the UE needs to use. In this case, the UE may receive network rejection and commence the cell reselection procedure to find another cell. However, the cell reselection procedure still does not guarantee to find a cell supporting the network slices for the UE.

Therefore, studies for a cell selection or a cell reselection considering a network slice in a wireless communication system are required.

In an aspect, a method performed by a wireless device in a wireless communication system is provided. A wireless device configures multiple network slices. A wireless device receives a network slice information related to the multiple network slices. A wireless device establishes a PDU session for a specific service. A wireless device determines one or more frequencies that support the at least one network slice, used by the PDU session, from among the multiple network slices based on the frequency information. A wireless device performs a cell selection procedure and/or a cell reselection procedure based on the determined one or more frequencies.

In another aspect, an apparatus for implementing the above method is provided.

The present disclosure can have various advantageous effects.

According to some embodiments of the present disclosure, a wireless device could efficiently perform a cell reselection and a cell reselection considering a network slice.

For example, a wireless device could (re)select a cell supporting the network slice (for example, the network slice configured in the UE and/or the network slice preferred by the UE) regardless of frequency information for cell selection from the network For example, a wireless device could continuously provide a service for a particular network slice, by (re)selecting a cell supporting the particular network slice.

For example, a wireless device could provide fast access to the network for a service, by (re)selecting a cell supporting the particular network slice.

According to some embodiments of the present disclosure, a wireless communication system could efficiently provide a solution for service continuity by considering a network slice.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
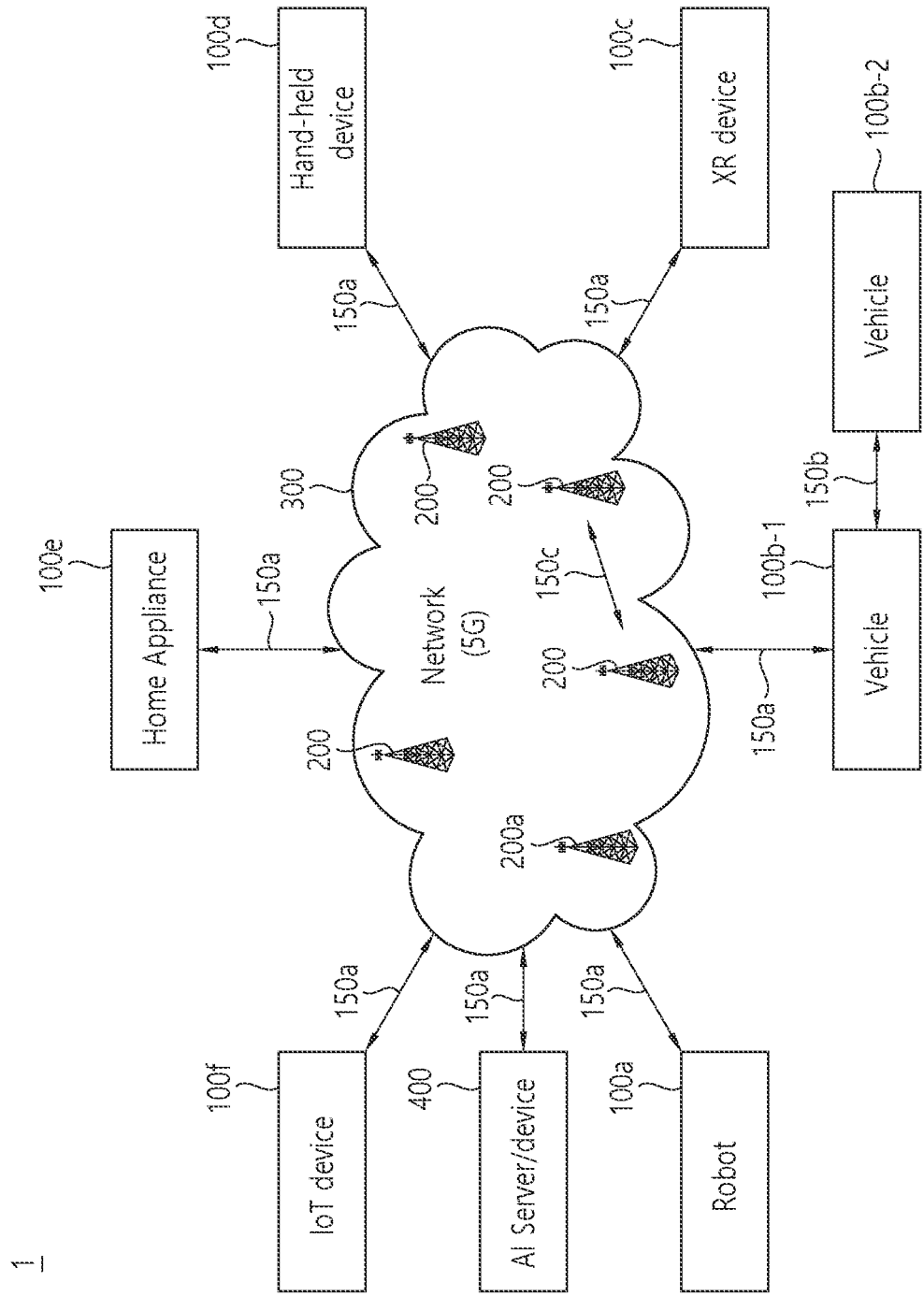
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B. C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (I) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
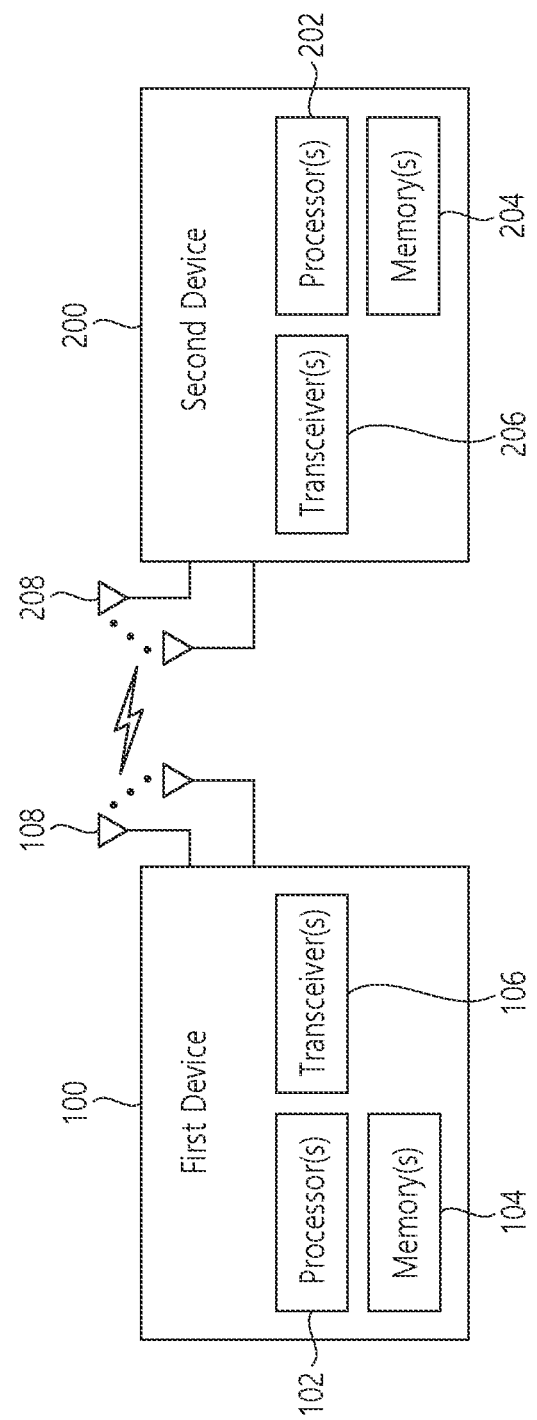
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs. SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
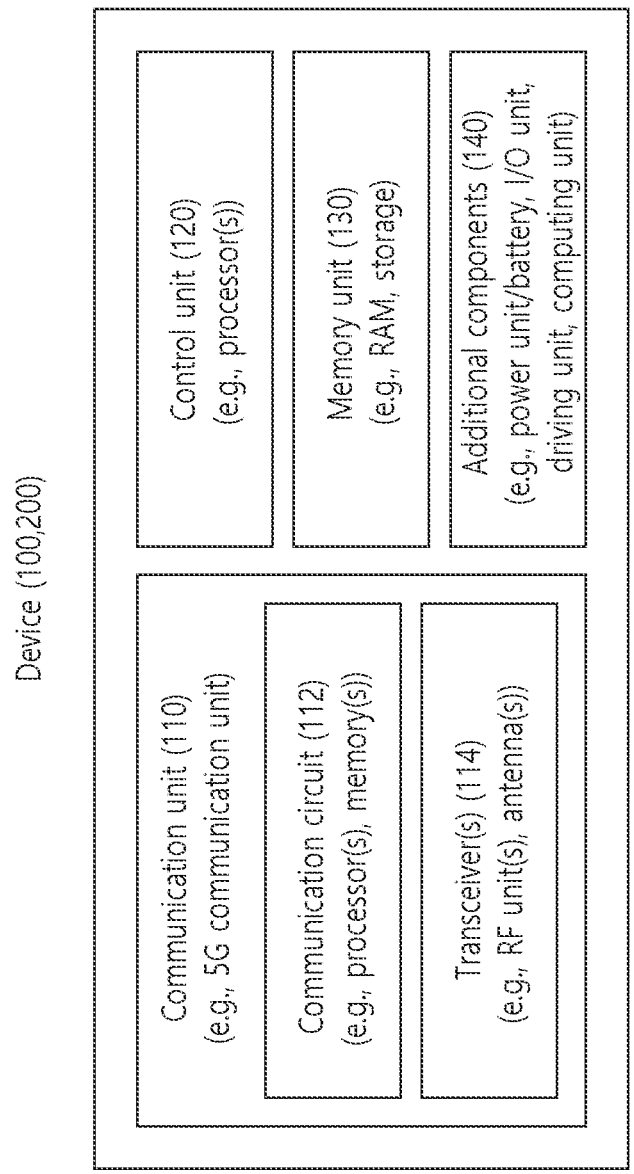
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
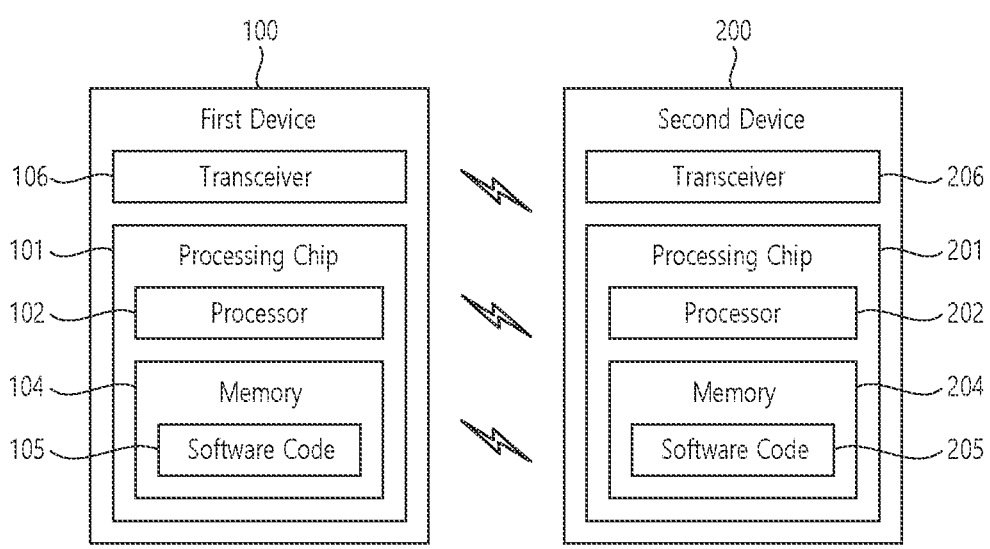
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such as a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
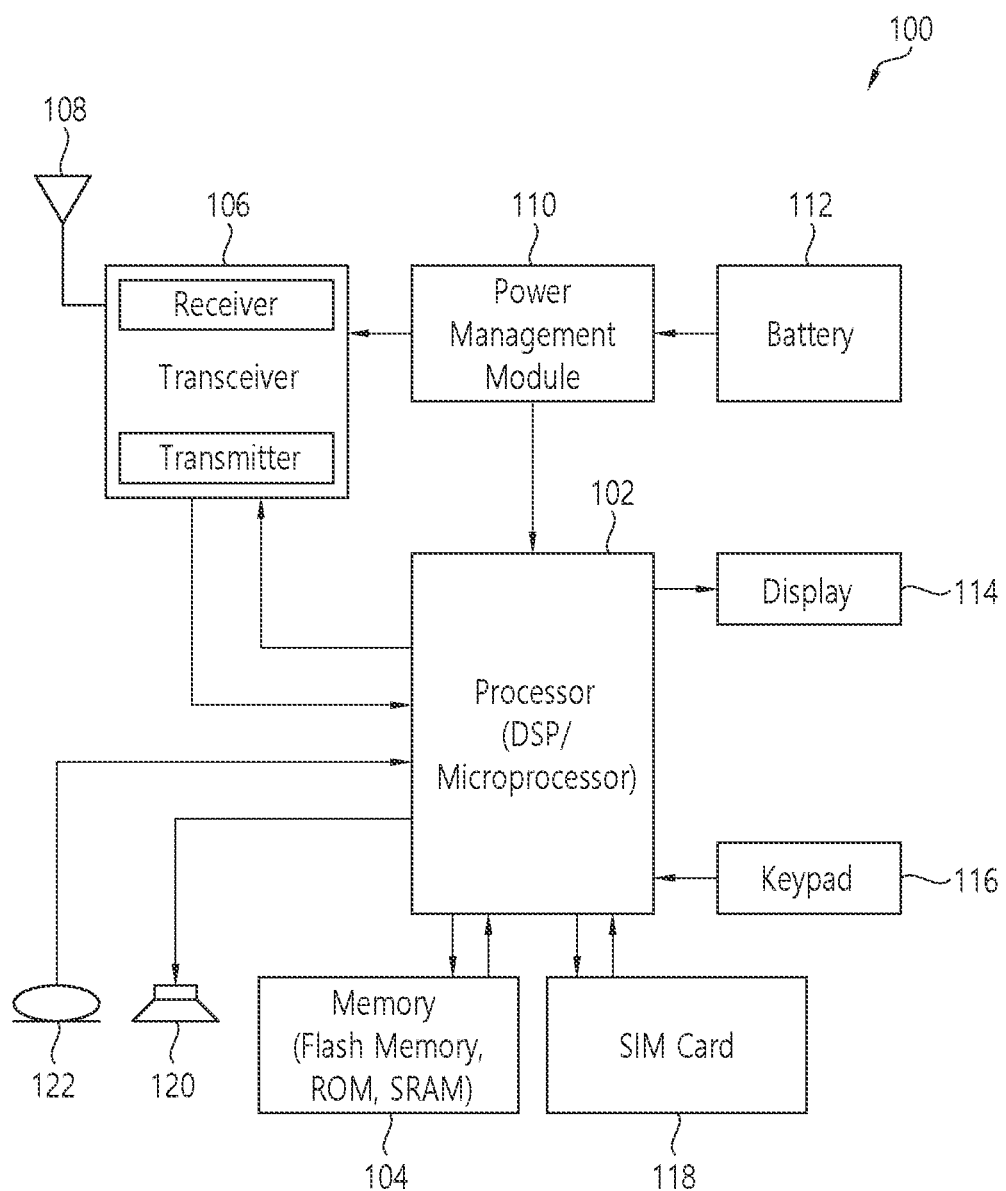
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
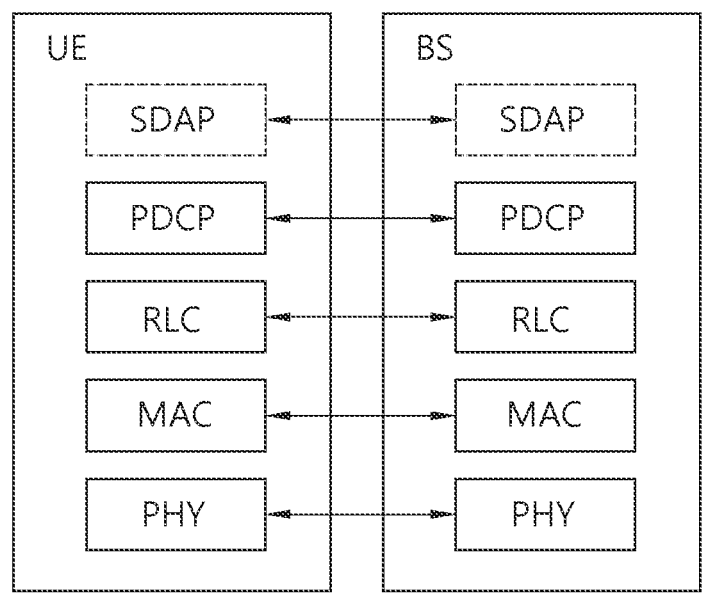
FIGS. 6 and 7 show an example of protocol stacks in a 3GPP based wireless communication system to which implementations of the present disclosure is applied.
Figure 7:
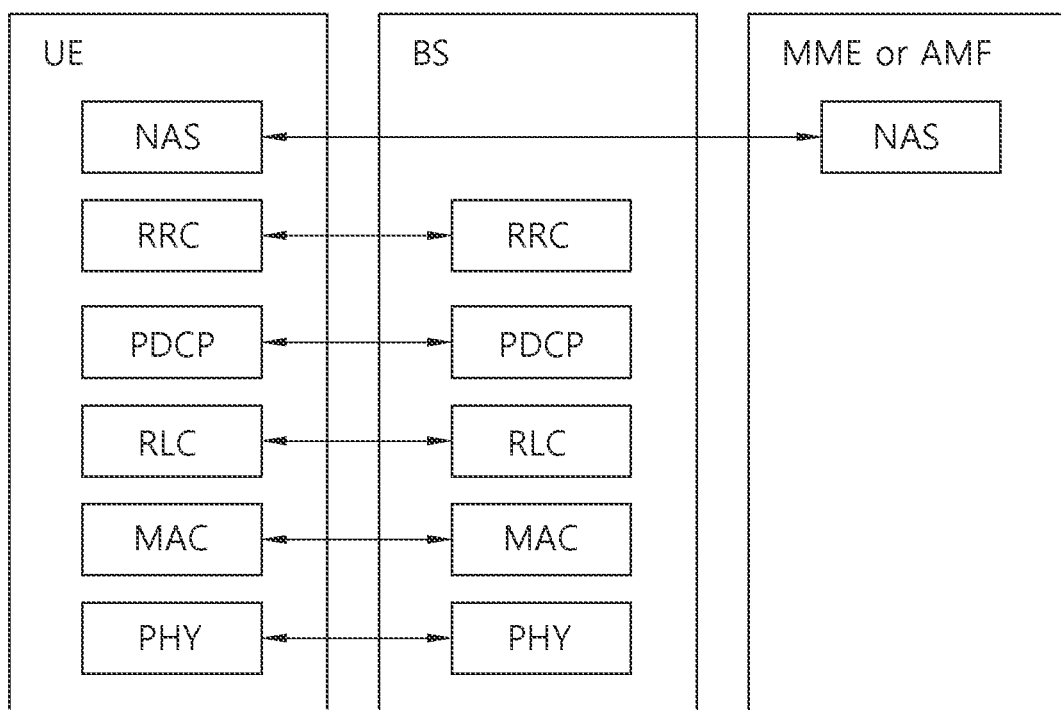

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined. i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM): duplicate detection (AM only): RLC SDU discard (AM and UM): RLC re-establishment: protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery: PDCP PDU routing (in case of split bearers): retransmission of PDCP SDUs; ciphering, deciphering and integrity protection; PDCP SDU discard; PDCP re-establishment and data recovery for RLC AM; PDCP status reporting for RLC AM: duplication of PDCP PDUs and duplicate discard indication to lower layers. The main services and functions of the PDCP sublayer for the control plane include: sequence numbering: ciphering, deciphering and integrity protection; transfer of control plane data: reordering and duplicate detection: in-order delivery; duplication of PDCP PDUs and duplicate discard indication to lower layers.

In the 3GPP NR system, the main services and functions of SDAP include: mapping between a QoS flow and a data radio bearer: marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management: establishment, configuration, maintenance and release of signaling radio bearers (SRBs) and data radio bearers (DRBs): mobility functions (including: handover and context transfer, UE cell selection and reselection and control of cell selection and reselection, inter-RAT mobility): QoS management functions; UE measurement reporting and control of the reporting; detection of and recovery from radio link failure; NAS message transfer to/from NAS from/to UE.

Figure 8:
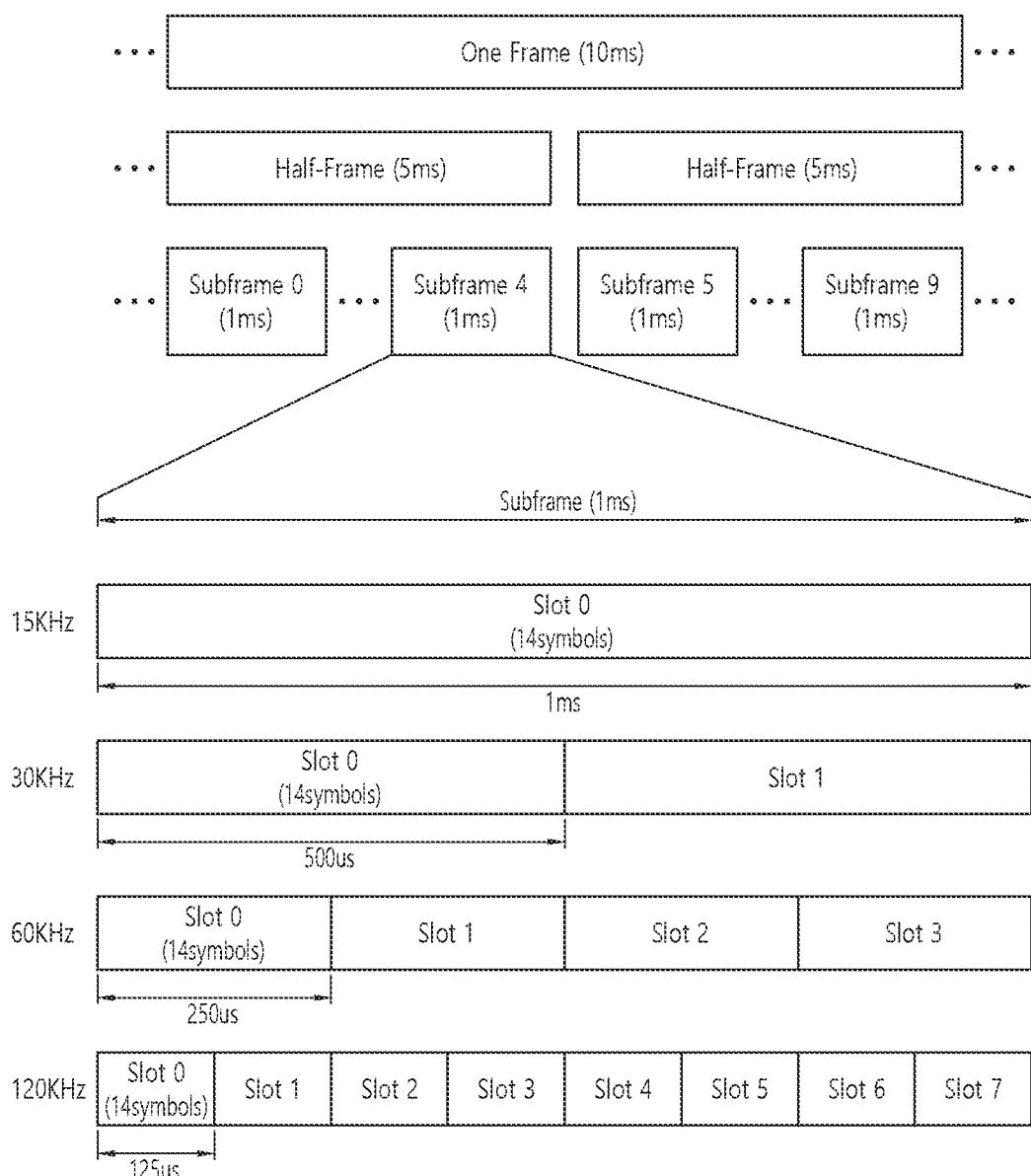
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f$=10 ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{frame,u}_{slot}$ for the normal CP, according to the subcarrier spacing $\Delta f=2^u*15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{frame,u}_{slot}$ for the extended CP, according to the subcarrier spacing $\Delta f=2^u*15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which anode can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
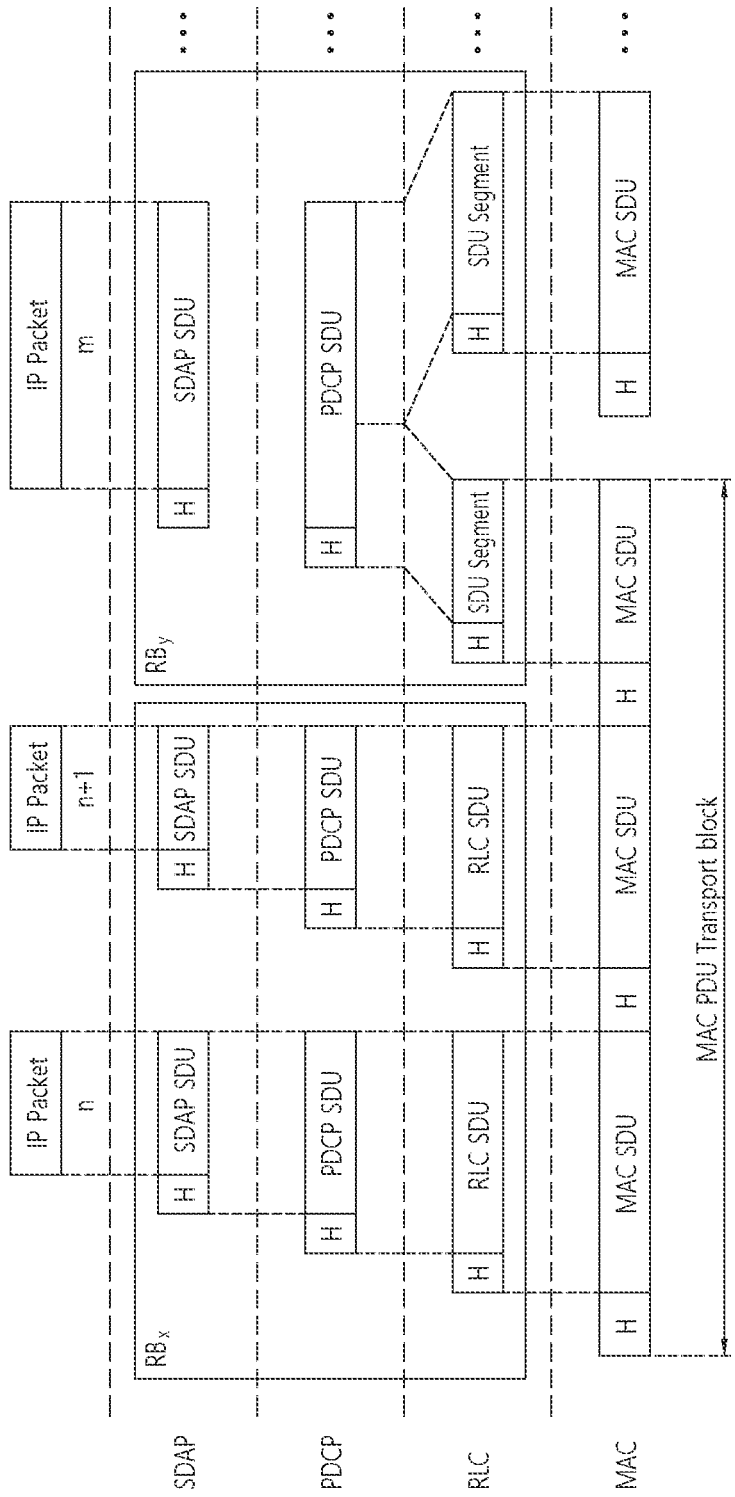
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH. PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Network Slicing is described. Section 16.3 of 3GPP TS 38.300 v16.1.0 may be referred.

The general principles and requirements related to the realization of network slicing in the NG-RAN for NR connected to 5GC and for E-UTRA connected to 5GC are given.

A network slice always consists of a RAN part and a CN part. The support of network slicing relies on the principle that traffic for different slices is handled by different PDU sessions. Network can realize the different network slices by scheduling and also by providing different L1/L2 configurations.

Each network slice is uniquely identified by an S-NSSAI. NSSAI (Network Slice Selection Assistance Information) includes one or a list of S-NSSAIs (Single NSSAI) where an S-NSSAI is a combination of:
  mandatory SST (Slice/Service Type) field, which identifies the slice type and consists of 8 bits (with range is 0-255);

optional SD (Slice Differentiator) field, which differentiates among Slices with same SST field and consist of 24 bits.

The list includes at most 8 S-NSSAI(s).

The UE provides NSSAI (Network Slice Selection Assistance Information) for network slice selection in RRCSetupComplete, if it has been provided by NAS. While the network can support large number of slices (hundreds), the UE may need not support more than 8 slices simultaneously. A BL UE or a NB-IoT UE supports a maximum of 8 slices simultaneously.

Network Slicing is a concept to allow differentiated treatment depending on each customer requirements. With slicing, it is possible for Mobile Network Operators (MNO) to consider customers as belonging to different tenant types with each having different service requirements that govern in terms of what slice types each tenant is eligible to use based on Service Level Agreement (SLA) and subscriptions.

The following key principles apply for support of Network Slicing in NG-RAN:

RAN awareness of slices
  NG-RAN supports a differentiated handling of traffic for different network slices which have been pre-configured. How NG-RAN supports the slice enabling in terms of NG-RAN functions (i.e. the set of network functions that comprise each slice) is implementation dependent.
Selection of RAN part of the network slice
  NG-RAN supports the selection of the RAN part of the network slice, by NSSAI provided by the UE or the 5GC which unambiguously identifies one or more of the pre-configured network slices in the PLMN.
Resource management between slices
  NG-RAN supports policy enforcement between slices as per service level agreements. It should be possible for a single NG-RAN node to support multiple slices. The NG-RAN should be free to apply the best RRM policy for the SLA in place to each supported slice.
Support of QoS procedure is described.
NG-RAN supports QoS differentiation within a slice.
RAN selection of CN entity
  For initial attach, the UE may provide NSSAI to support the selection of an Access and Mobility management Function (AMF). If available, NG-RAN uses this information for routing the initial NAS to an AMF. If the NG-RAN is unable to select an AMF using this information or the UE does not provide any such information the NG-RAN sends the NAS signalling to one of the default AMFs.
  For subsequent accesses, the UE provides a Temp ID, which is assigned to the UE by the 5GC, to enable the NG-RAN to route the NAS message to the appropriate AMF as long as the Temp ID is valid (NG-RAN is aware of and can reach the AMF which is associated with the Temp ID). Otherwise, the methods for initial attach applies.
Resource isolation between slices
  The NG-RAN supports resource isolation between slices. NG-RAN resource isolation may be achieved by means of RRM policies and protection mechanisms that should avoid that shortage of shared resources in one slice breaks the service level agreement for another slice. It should be possible to fully dedicate NG-RAN resources to a certain slice. How NG-RAN supports resource isolation is implementation dependent.
Access control
  By means of the unified access control, operator-defined access categories can be used to enable differentiated handling for different slices. NG-RAN may broadcast barring control information (i.e. a list of barring parameters associated with operator-defined access categories) to minimize the impact of congested slices.
Slice Availability
  Some slices may be available only in part of the network. The NG-RAN supported S-NSSAI(s) is configured by OAM. Awareness in the NG-RAN of the slices supported in the cells of its neighbours may be beneficial for inter-frequency mobility in connected mode. It is assumed that the slice availability does not change within the UE's registration area.
  The NG-RAN and the 5GC are responsible to handle a service request for a slice that may or may not be available in a given area. Admission or rejection of access to a slice may depend by factors such as support for the slice, availability of resources, support of the requested service by NG-RAN.
Support for UE associating with multiple network slices simultaneously
  In case a UE is associated with multiple slices simultaneously, only one signalling connection is maintained and for intra-frequency cell reselection, the UE always tries to camp on the best cell. For inter-frequency cell reselection, dedicated priorities can be used to control the frequency on which the UE camps.
Granularity of slice awareness
  Slice awareness in NG-RAN is introduced at PDU session level, by indicating the S-NSSAI corresponding to the PDU Session, in all signalling containing PDU session resource information.
Validation of the UE rights to access a network slice
  It is the responsibility of the 5GC to validate that the UE has the rights to access a network slice. Prior to receiving the Initial Context Setup Request message, the NG-RAN may be allowed to apply some provisional/local policies, based on awareness of which slice the UE is requesting access to. During the initial context setup, the NG-RAN is informed of the slice for which resources are being requested.

AMF and NW Slice Selection is described. NG-RAN selects AMF based on a Temp ID or NSSAI provided by the UE over RRC.

Table 5 shows an example, of AMF selection based on Temp ID and NSSAI.

TABLE 5

| Temp ID | NSSAI | AMF Selection by NG-RAN |
| --- | --- | --- |
| not available or invalid | not available | One of the default AMFs is selected (NOTE) |
| not available or invalid | present | Selects AMF which supports UE requested slices |
| valid | not available, or present | Selects AMF per CN identity information in Temp ID |

The set of default AMFs is configured in the NG-RAN nodes via OAM.

When triggered by the upper layer, the UE conveys the NSSAI over RRC in the format explicitly indicated by the upper layer.

Resource isolation enables specialized customization and avoids one slice affecting another slice.

Hardware/software resource isolation is up to implementation. Each slice may be assigned with either shared or dedicated radio resource up to RRM implementation and SLA.

To enable differentiated handling of traffic for network slices with different SLA:
  NG-RAN is configured with a set of different configurations for different network slices by OAM;
  To select the appropriate configuration for the traffic for each network slice, NG-RAN receives relevant information indicating which of the configurations applies for this specific network slice.
AMF and NW Slice Selection is described.

RAN selects the AMF based on a Temp ID or NSSAI provided by the UE.

In case a Temp ID is not available, the NG-RAN uses the NSSAI provided by the UE at RRC connection establishment to select the appropriate AMF (the information is provided after MSG3 of the random access procedure). If such information is also not available, the NG-RAN routes the UE to one of the configured default AMF(s).

The NG-RAN uses the list of supported S-NSSAI(s) previously received in the NG Setup Response message when selecting the AMF with the NSSAI. This list may be updated via the AMF Configuration Update message.

Figure 10:
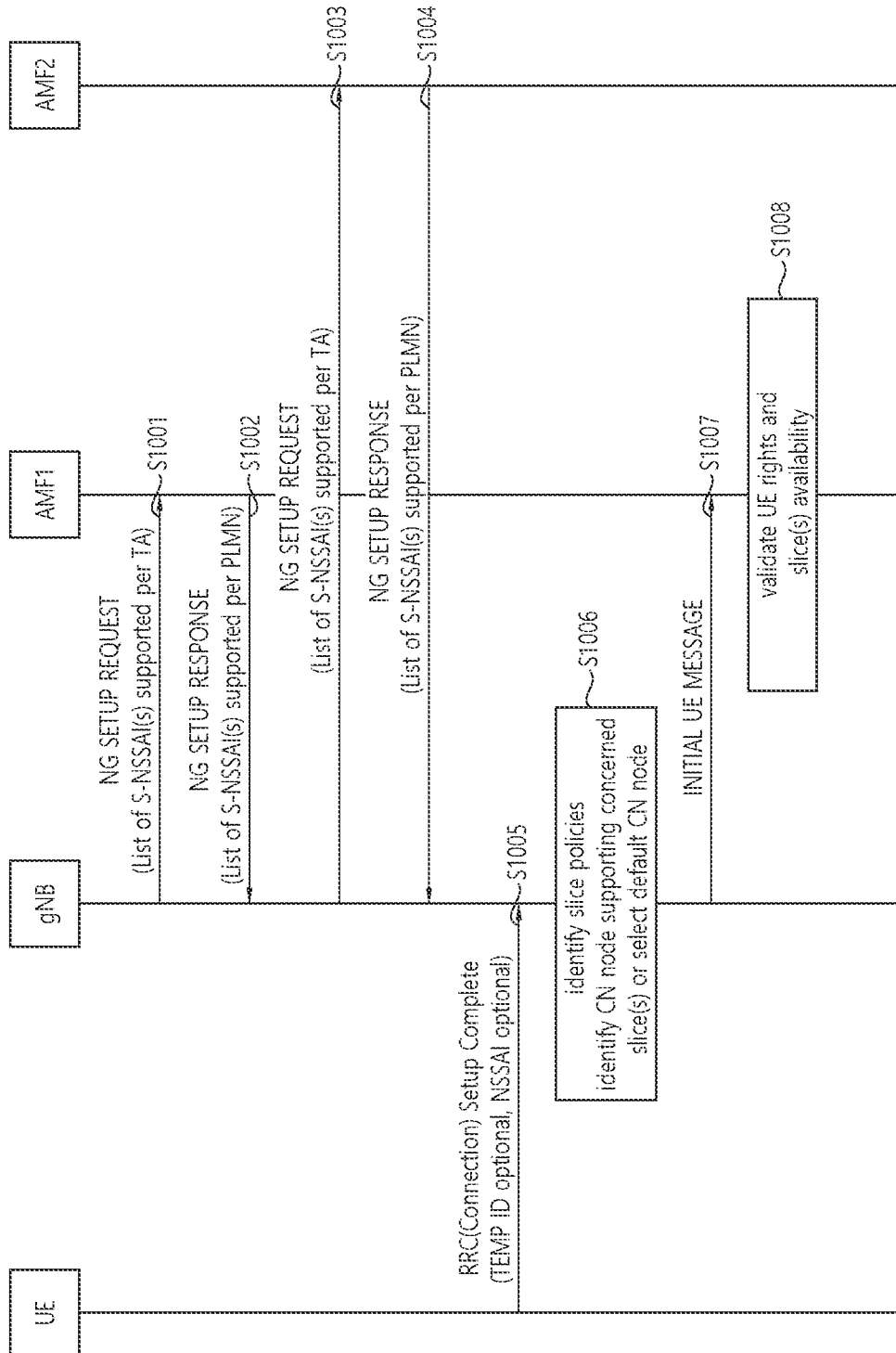
FIG. 10 shows an example for AMF selection procedure to which implementations of the present disclosure is applied.

FIG. 10 shows an example for AMF selection procedure to which implementations of the present disclosure is applied.

In step S1001, a gNB may transmit, to a first AMF (AMF1), an NG SETUP REQUEST message including list of S-NSSAI(s) supported per Tracking Area (TA).

In step S1002, the first AMF may transmit, to the gNB, an NG SETUP RESPONSE message including lint of S-NSSAI (s) supported per Public Land Mobile Network (PLMN).

In step S1003, the gNB may transmit, to a second AMF (AMF2), an NG SETUP REQUEST message including list of S-NSSAI supported per TA.

In step S1004, the second AMF may transmit, to the gNB, an NG SETUP RESPONSE message including list of S-NSSAI(s) supported per PLMN.

In step S1005, a UE may transmit, to the gNB, an RRC (Connection) Setup Complete message including Temp ID and/or NSSAI, optionally.

In step S1006, the gNB may identify slice policies, identify CN node supporting concerned slice(s), and/or select default CN node.

In step S1007, the gNB may transmit, to the first AMF, an INITIAL UE MESSAGE.

In step S1008, the first AMF may validate UE rights and slice(s) availability.

PDU Session Setup Handling procedure is described.

When new PDU sessions need to be established, the 5GC requests the NG-RAN to allocate/resources relative to the relevant PDU sessions by means of the PDU Session Resource Setup procedures over NG-C. One S-NSSAI is added per PDU session to be established, so NG-RAN is enabled to apply policies at PDU session level according to the SLA represented by the network slice, while still being able to apply (for example) differentiated QoS within the slice.

NG-RAN confirms the establishment of the resources for a PDU session associated to a certain network slice by responding with the PDU Session Resource Setup Response message over the NG-C interface.

Figure 11:
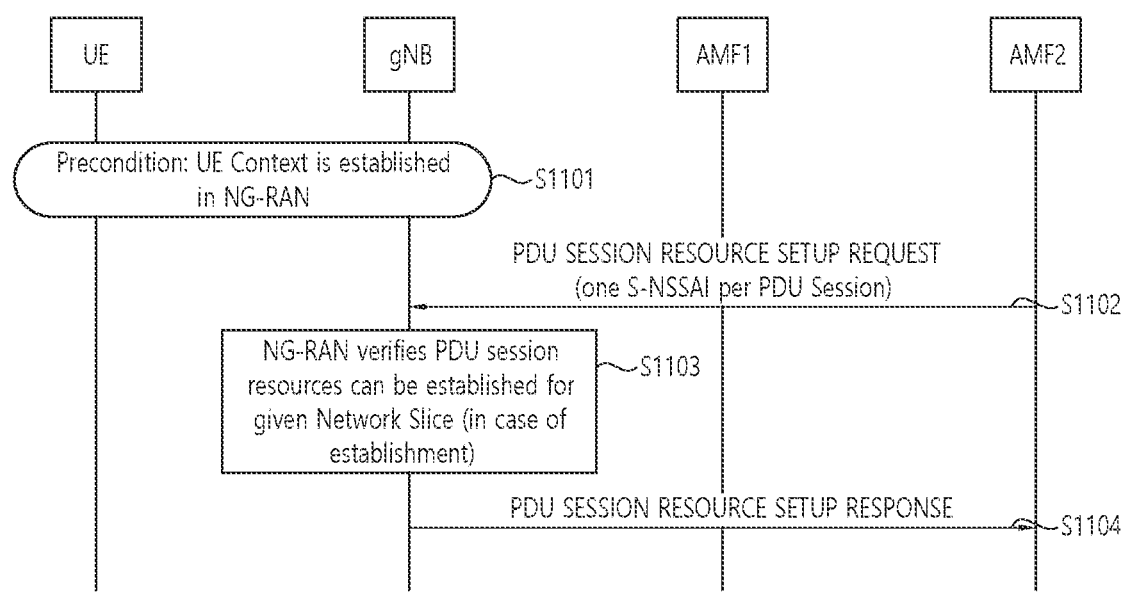
FIG. 11 shows an example for Network Slice-aware PDU Session Resource Setup procedure to which implementations of the present disclosure is applied.

FIG. 11 shows an example for Network Slice-aware PDU Session Resource Setup procedure to which implementations of the present disclosure is applied.

In step S1101, a gNB may establish a UE context for a UE. For example, step S1101 may be performed as a precondition.

In step S1102, a second AMF (AMF2) mat transmit a PDU SESSION RESOURCE SETUP REQUEST to the gNB. For example, one S-NSSAI may be configured per a PDU session.

In S1103, a gNB may verify that PDU session resources can be established for a given Network Slice (in case of establishment).

In S1104, a gNB may transmit PDU SESSION RESOURCE SETUP RESPONSE to the second AMF.

Cell selection and reselection is described. Section 5.2 of 3GPP TS 38.304 v16.0.0 may be referred.

UE shall perform measurements for cell selection and reselection purposes.

When evaluating Srxlev and Squal of non-serving cells for reselection evaluation purposes, the UE shall use parameters provided by the serving cell and for the final check on cell selection criterion, the UE shall use parameters provided by the target cell for cell reselection.

The NAS can control the RAT(s) in which the cell selection should be performed, for instance by indicating RAT(s) associated with the selected PLMN, and by maintaining a list of forbidden registration area(s) and a list of equivalent PLMNs. The UE shall select a suitable cell based on RRC_IDLE or RRC_INACTIVE state measurements and cell selection criteria.

In order to expedite the cell selection process, stored information for several RATs, if available, may be used by the UE.

When camped on a cell, the UE shall regularly search for a better cell according to the cell reselection criteria. If a better cell is found, that cell is selected. The change of cell may imply a change of RAT.

The NAS is informed if the cell selection and reselection result in changes in the received system information relevant for NAS.

For normal service, the UE shall camp on a suitable cell, monitor control channel(s) of that cell so that the UE can:
  receive system information from the PLMN or SNPN; and
  receive registration area information from the PLMN or SNPN, e.g., tracking area information; and
  receive other AS and NAS Information; and
  if registered:
  receive paging and notification messages from the PLMN or SNPN; and
  initiate transfer to Connected mode.

For cell selection in multi-beam operations, measurement quantity of a cell is up to UE implementation.

For cell reselection in multi-beam operations, including inter-RAT reselection from E-UTRA to NR, the measurement quantity of this cell is derived amongst the beams corresponding to the same cell based on SS/PBCH block as follows:
  if nrofSS-BlocksToAverage (maxRS-IndexCellQual in E-UTRA) is not configured in SIB2/SIB4 (SIB24 in E-UTRA); or
  if absThreshSS-BlocksConsohidation (threshRS-Index in E-UTRA) is not configured in SIB2-SIB4 (SIB24 in E-UTRA): or
  if the highest beam measurement quantity value is below or equal to absThreshSS-BlocksConsolidation (threshRS-Index in E-UTRA):
  derive a cell measurement quantity as the highest beam measurement quantity value.

else:
   derive a cell measurement quantity as the linear average of the power values of up to nrofSS-BlocksToAverage (maxRS-IndexCellQual in E-UTRA) of highest beam measurement quantity values above absThreshSS-BlocksConsolidation (threshRS-Index in E-UTRA).

Cell selection is performed by one of the following two procedures:

a) Initial cell selection (no prior knowledge of which RF channels are NR frequencies):
1. The UE shall scan all RF channels in the NR bands according to its capabilities to find a suitable cell.
2. On each frequency, the UE need only search for the strongest cell, except for operation with shared spectrum channel access where the UE may search for the next strongest cell(s).
3. Once a suitable cell is found, this cell shall be selected.

b) Cell selection by leveraging stored information:
1. This procedure requires stored information of frequencies and optionally also information on cell parameters from previously received measurement control information elements or from previously detected cells.
2. Once the UE has found a suitable cell, the UE shall select it.
3. If no suitable cell is found, the initial cell selection procedure in a) shall be started.

Priorities between different frequencies or RATs provided to the UE by system information or dedicated signalling are not used in the cell selection process.

Cell Reselection evaluation process and Reselection priorities handling procedure are described.

Absolute priorities of different NR frequencies or inter-RAT frequencies may be provided to the UE in the system information, in the RRCRelease message, or by inheriting from another RAT at inter-RAT cell (re)selection. In the case of system information, an NR frequency or inter-RAT frequency may be listed without providing a priority (i.e. the field cellReselectionPriority is absent for that frequency). If priorities are provided in dedicated signalling, the UE shall ignore all the priorities provided in system information. If UE is in camped on any cell state, UE shall only apply the priorities provided by system information from current cell, and the UE preserves priorities provided by dedicated signalling and deprioritisationReq received in RRCRelease unless specified otherwise. When the UE in camped normally state, has only dedicated priorities other than for the current frequency, the UE shall consider the current frequency to be the lowest priority frequency (i.e. lower than any of the network configured values). If the UE is configured to perform both NR sidelink communication and V2X sidelink communication, the UE may consider the frequency providing both NR sidelink communication configuration and V2X sidelink communication configuration to be the highest priority. If the UE is configured to perform only NR sidelink communication, the UE may consider the frequency providing NR sidelink communication configuration to be the highest priority. If the UE is configured to perform only V2X sidelink communication, the UE may consider the frequency providing V2X sidelink communication configuration to be the highest priority.

The frequency only providing the anchor frequency configuration should not be prioritized for V2X service during cell reselection.

When UE is configured to perform NR sidelink communication or V2X sidelink communication performs cell reselection, it may consider the frequencies providing the intra-carrier and inter-carrier configuration have equal priority in cell reselection.

The prioritization among the frequencies which UE considers to be the highest priority frequency is left to UE implementation.

UE is configured to perform V2X sidelink communication or NR sidelink communication, if it has the capability and is authorized for the corresponding sidelink operation.

When UE is configured to perform both NR sidelink communication and V2X sidelink communication, but cannot find a frequency which can provide both NR sidelink communication configuration and V2X sidelink communication configuration, UE may consider the frequency providing either NR sidelink communication configuration or V2X sidelink communication configuration to be the highest priority.

The UE shall only perform cell reselection evaluation for NR frequencies and inter-RAT frequencies that are given in system information and for which the UE has a priority provided.

In case UE receives RRCRelease with deprioritisationReq, UE shall consider current frequency and stored frequencies due to the previously received RRCRelease with deprioritisationReq or all the frequencies of NR to be the lowest priority frequency (i.e. lower than any of the network configured values) while T325 is running irrespective of camped RAT. The UE shall delete the stored deprioritisation request(s) when a PLMN selection or SNPN selection is performed on request by NAS.

UE should search for a higher priority layer for cell reselection as soon as possible after the change of priority.

The UE shall delete priorities provided by dedicated signalling when:
   the UE enters a different RRC state; or
   the optional validity time of dedicated priorities (T320) expires; or
   the UE receives an RRCRelease message with the field cellReselectionPriorities absent; or
   a PLMN selection or SNPN selection is performed on request by NAS.

Equal priorities between RATs are not supported.

The UE shall not consider any black listed cells as candidate for cell reselection.

The UE shall consider only the white listed cells, if configured, as candidates for cell reselection.

The UE in RRC_IDLE state shall inherit the priorities provided by dedicated signalling and the remaining validity time (i.e. T320 in NR and E-UTRA), if configured, at inter-RAT cell (re)selection.

The network may assign dedicated cell reselection priorities for frequencies not configured by system information.

Meanwhile, a radio frequency may be associated with a particular network slice. A particular service associated with the particular network slice may be provided via the associated radio frequency. In this case, the network slice information may need to be considered when the UE selects a suitable or better cell.

The UE following the legacy cell (re)selection procedure based on only frequency priority and cell quality may not be able to support service continuity, when a new cell does not support the network slice that the UE needs to use. In this case, the UE may receive network rejection and commence the cell reselection procedure to find another cell, which still does not guarantee to find a cell supporting the network slices the UE needs to use.

In addition, if the UE in RRC_INACTIVE with suspended services selects a cell that cannot support the network slice providing the suspended service, the UE may need to transit to RRC_IDLE and re-establish PDU session in a new cell.

Figure 12:
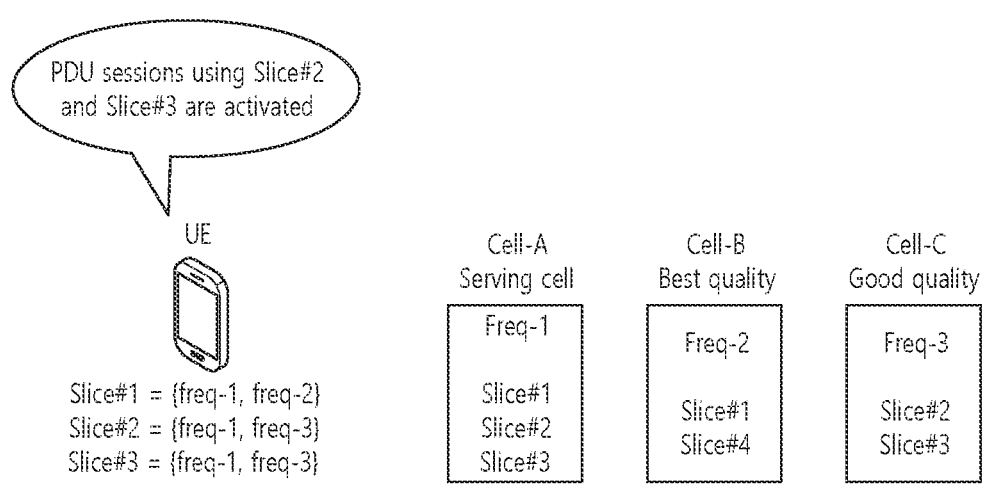
FIG. 12 shows an example of a scenario for a cell selection or a cell reselection considering a network slice to which implementations of the present disclosure is applied.

FIG. 12 shows an example of a scenario for a cell selection or a cell reselection considering a network slice to which implementations of the present disclosure is applied.

Referring to FIG. 12, the UE may be configured to use Slice #1, Slice #2 and Slice #3 during a registration procedure. The UE may activate PDU sessions using Slice #2 and Slice #3. Then, UE may transit to RRC_INACTIVE such that radio bearers using Slice #2 and Slice #3 are suspended.

In a cell (re)selection procedure not considering a network slice, the UE would select the best cell, Cell-B, based on cell quality. However, Cell-B could not support suspended services using Slice #2 and Slice #3. This may result in service reject from the network. The UE would search for another cell.

In this case, Cell-C supporting both Slice #2 and Slice #3 may be the best cell because it guarantees the service continuity for suspended services using Slice #2 and Slice #3, although the cell quality is not as good as that of Cell-B.

Therefore, studies for a cell selection or a cell reselection considering a network slice in a wireless communication system are required.

Hereinafter, a method for a cell selection or a cell reselection considering a network slice in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 13:
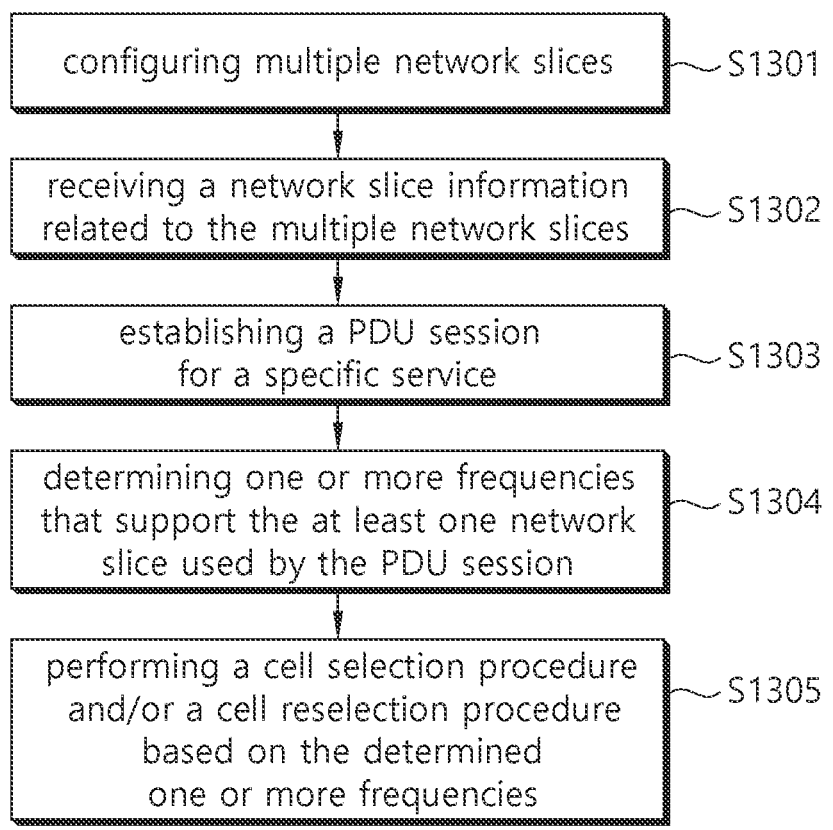
FIG. 13 shows an example of a method for a cell selection or a cell reselection considering a network slice in a wireless communication system, according to some embodiments of the present disclosure.

FIG. 13 shows an example of a method for a cell selection or a cell reselection considering a network slice in a wireless communication system, according to some embodiments of the present disclosure.

In particular, FIG. 13 shows an example of a method performed by a wireless device.

In step S1301, a wireless device may configure multiple network slices.

For example, the wireless device may be configured with multiple network slices. For example, the configured multiple network slices may be (pre-)configured based on the network slice configuration received from a network.

For example, one or more of the multiple network slices may be identified by a network slice identity determined by a RAN node.

For example, each of the multiple network slices may be identified by one or more of Single Network Slice Selection Assistance informations (S-NSSAIs). For example, the network slice may be identified by a short format based on S-NSSAI.

For example, the network slice may be identified by Slice/Service Type (SST). The network slice may be identified by SST and the part of Service Differentiator (SD). The network slice may be identified by an RAN specific value calculated based on SST and/or SD.

For example, each of the multiple network slices may be identified by RAN specific values. For example, a RAN node may have the mapping information between the RAN specific slice identity and S-NSSAI.

For example, the wireless device may have the configured network slice. The configured network slice may be (pre) configured based on the network slice configuration. The wireless device may support the network slice based on the subscription policy, the supporting frequency band, UE capabilities, and/or the supported services. The configured network slice(s) may be (pre-)configured based on configured NSSAI. The wireless device may be allowed to use the configured network slice(s) and/or configured NSSAI based on the UE subscription policy and/or the network configuration.

For example, the UE configured with NSSAI may be updated with the allowed NSSAI from the network via dedicated NAS signalling (for example, Registration accept message, UE Configuration Update command message) and/or RRC signalling (for example, RRCReconfiguration message, RRCRelease message).

In step S1302, a wireless device may receive a network slice information related to the multiple network slices. The network slice information may inform at least one of network slices supported by each frequency among the multiple network slices.

For example, the network slice information may be included in a system information block broadcasted from a network and/or a dedicated signalling transmitted from a network.

For example, the network slice information may be configured with cell access and/or cell selection information.

For example, the network slice information may include a list of S-NSSAI.

According to some embodiments of the present disclosure, the network slice information may include an information on a validity area, where the network slice information is valid.

For example, the information on the validity area may include information on (i) one or more cells, (ii) one or more RAN areas, (iii) one or more tracking areas, and/or (iv) one or more geographical areas. For example, the information on the validity area may include a list of identities of one or more cells. RAN area, tracking area and/or geographical area.

For example, the network slice information may be configured for a particular area.

For example, the network slice information may be provided for tracking area, RAN area and/or geographical area. The list of area identities may be configured with the configured network slice, the allowed network slice, and/or the supported network slice.

For example, the network slice information may be configured for one or more cells. The list of cell IDs may be configured with the configured network slice, the allowed network slice, and/or the supported network slice.

For example, the wireless device may delete or release the network slice information and the associated frequency information received from the network, when the UE moves out of the validity area.

In step S1303, a wireless device may establish a PDU session for a specific service. The PDU session may use at least one network slice.

In step S1304, a wireless device may determine one or more frequencies that support the at least one network slice, used by the PDU session, from among the multiple network slices based on the frequency information.

For example, the wireless device may perform relaxed measurement for the frequency which does not support the at least one network slice used by the PDU session.

In step S1305, a wireless device may perform a cell selection procedure and/or a cell reselection procedure based on the determined one or more frequencies.

For example, in the cell selection procedure and/or the cell reselection procedure, the wireless device may assign a highest priority to a specific frequency that support the at least one network slice used by the PDU session. Therefore, the wireless device could select or reselect a cell on the specific frequency that supports the at least one network slice used by the PDU session.

For example, in the cell selection procedure and/or the cell reselection procedure includes, the wireless device may bar a specific frequency which does not support the at least one network slice used by the PDU session. Therefore, the wireless device may not select or reselect a cell on a frequency that does not support the at least one network slice used by the PDU session.

For example, in the cell selection procedure and/or the cell reselection procedure, the wireless device may select a cell on the determined one or more frequencies.

For example, in the cell selection procedure and/or the cell reselection procedure, the wireless device may select a cell that supports a maximum number of the at least one network slice used by the PDU session. For example, plurality of network slices could be used by the PDU session for the specific service. If a first cell support one network slice used by the PDU session and a second cell support two network slices used by the PDU session, the wireless device may select the second cell. For example, if a first frequency support one network slice used by the PDU session and a second frequency support two network slices used by the PDU session, the wireless device may select a cell on the second frequency.

According to some embodiments of the present disclosure, the wireless device may receive a time information informing that the at least one network slice used by the PDU session is unavailable for a certain time period.

The wireless device may suspend the cell selection procedure and/or the cell reselection procedure for the certain time period.

For example, the wireless device may receive the indication that the network slice is unavailable for a certain period of time. If the UE receives this indication, the UE may perform only frequency and cell quality based cell (re)selection (i.e., legacy cell (re)selection) for the certain period of time. The UE may suspend/delay the network slice based cell (re)selection for the certain period of time.

According to some embodiments of the present disclosure, the wireless device may receive the specific service via a selected cell from the cell selection procedure and/or the cell reselection procedure.

For example, the wireless device may send uplink transmission in the (re)selected cell.

According to some embodiments of the present disclosure, the wireless device is in communication with at least one of a user equipment, a network, or an autonomous vehicle other than the wireless device.

Hereinafter, an example of a method for a cell selection or a cell reselection considering a network slice in a wireless communication system, according to some embodiments of the present disclosure, is described.

For service continuity and fast access, a UE with configured network slice(s) may perform cell (re)selection based on a network slice information related to cell (re)selection. The UE could (re)select a frequency that supports a particular network slice(s) providing a particular service based on the network slice information related to cell (re)selection, as long as the quality of a cell on the frequency that supports the particular network slice(s) is good enough to provide service. The UE could use the particular service associated with the particular network slice(s) on the (re)selected frequency.

According to some embodiments of the present disclosure, the network slice configuration may configure particular network slice(s) to the UE. For example, referring to FIG. 12, the network slice configuration may configure Slice #1, Slice #2 and Slice #3 to the UE. The network slice configuration may be pre-configured to the UE.

For example, the network slice information related to cell (re)selection (for example, the network slice information may be simply recited as a network slice information) may be used for performing cell (re)selection. The network slice information may be associated with frequency information.

The network slice information may be preconfigured and/or transmitted to the UE via broadcast and/or dedicated signalling from the network. The network slice information may be associated with frequency information.

According to some embodiments of the present disclosure, the UE may have the configured network slice. The configured network slice may be (pre)configured based on the network slice configuration. The UE may support the network slice based on (i) the subscription policy, (ii) the supporting frequency band, (iii) UE capabilities, and/or (iv) the supported services (for example, Internet of Things (I), vehicle-to-everything (V2X), etc.).

According to some embodiments of the present disclosure, the network slice information may be configured for a particular area.

For example, the network slice information may be provided for tracking area, RAN area and/or geographical area. The list of area identities may be configured with the configured network slices, the allowed network slices, and/or the supported network slice.

For example, the network slice information may be configured for one or more cells. The list of cell IDs may be configured with the configured network slice information, the allowed network slice information, and/or the supported network slice information.

For example, the UE may delete and/or release the network slice information and the associated frequency information received from the network when the UE moves out of the configured area (for example, tracking area, RAN area, geographical area, and/or one or more cells) where the UE has received the network slice information.

According to some embodiments of the present disclosure, the UE may have a preferred network slice. The preferred network slice may be a subset of the configured network slice in the UE. The preferred network slice may include the network slice supporting one or more established PDU sessions and/or PDN connectivity with suspended radio bearers in RRC_INACTIVE.

According to some embodiments of the present disclosure, the network slice information may include a list of S-NSSAI.

According to some embodiments of the present disclosure, the network slice information may be associated with validity area information. The validity area information may be the list of identities of one or more cells, RAN area, tracking area and/or geographical area. The network slice information may be valid in the validity area.

According to some embodiments of the present disclosure, the network slice may be identified by a short format based on Network Slice Selection Assistance Information (S-NSSAI).

For example, the network slice may be identified by Slice/Service Type (SST).

For example, the network slice may be identified by SST and the part of Service Differentiator (SD).

For example, the network slice may be identified by an RAN specific value calculated based on SST and/or SD.

According to some embodiments of the present disclosure, the network slice may be identified by RAN specific values, and the RAN node may have the mapping information between the RAN specific slice identity and S-NSSAI.

According to some embodiments of the present disclosure, the network slice information may be configured with cell access and/or cell selection information. For example, the network slice information may be included in a System Information Block (SIB), for example SIB Type I (SIB1).

For example, table 6 shows an example of the network slice included in a SIB as an S-NSSAI-List. For example, the SIB may include a cell Selection Information, which includes the S-NSSAI-List.

TABLE 6

```
cellSelectionInfo              SEQUENCE {
    q-RxLevMin                 Q-RxLevMin,
    q-RxLevMinOffset           INTEGER  (1..8) OPTIONAL,  -- Need S
    q-RxLevMinSUL              Q-RxLevMin      OPTIONAL,  -- Need R
    q-QualMin                  Q-QualMin       OPTIONAL,  -- Need S
    q-QualMinOffset            INTEGER (1..8)  OPTIONAL,  -- Need S
S-NSSAI-List  SEQUENCE (SIZE (1..maxNrofS-NSSAI)) OF S-NSSAI
}                                              OPTIONAL,  -- Cond Standalone
```

For example, table 7 shows an example of the network slice included in a SIB as an 5-NSSAI-List. For example, the SIB may include a Cell Access Related Information, which includes the S-NSSAI-List.

TABLE 7

```
CellAccessRelatedInfo      ::=  SEQUENCE {
    plmn-IdentityList           PLMN-IdentityInfoList,
    cellReservedForOtherUse     ENUMERATED {true}   OPTIONAL,
-- Need R
    ...,
    S-NSSAI-List  SEQUENCE (SIZE (1..maxNrofS-NSSAI)) OF S-NSSAI
}
```

For example, table 8 shows an example of the network slice included in a SIB as an S-NSSAI-List. For example, the SIB may include a PLMN Identity Information, which includes the S-NSSAI-List.

TABLE 8

```
PLMN-IdentityInfo ::=                SEQUENCE {
    plmn-IdentityList    SEQUENCE (SIZE (1..maxPLMN)) OF PLMN-Identity
    trackingAreaCode   TrackingAreaCode        OPTIONAL,  -- Need R
    ranac              RAN-AreaCode            OPTIONAL,  -- Need R
    cellIdentity                               CellIdentity,
    cellReservedForOperatorUse                 ENUMERATED {reserved,
notReserved},
    ...,
    S-NSSAI-List   SEQUENCE (SIZE (1.maxNrofS-NSSAI)) OF S-NSSAI
}
```

For example, table 9 shows an example of the network slice included in a SIB as an S-NSSAI-List. For example, a SIB may include frequency band information, which is associated with one or more network slice information, as follows.

TABLE 9

```
FreqBandSliceInfoList    ::=     SEQUENCE
(SIZE  (1..maxNrofMultiBands)) OF
FreqBandSliceInfo
FreqBandSliceInfo ::= SEQUENCE {
    FreqBandIndicatorNR ::= INTEGER (1..1024)
    S-NSSAI-List      SEQUENCE (SIZE
    (1..maxNrofS-NSSAI)) OF S-NSSAI
}
```

For example, table 10 shows an example of the network slice included in a SIB as an S-NSSAI-Configuration. For example, the network slice information and the associated one or more radio resources information may be included in a SIB, as follows.

TABLE 10

```
S-NSSAI-Config     ::=      SEQUENCE  {
SIZE (1..maxNrofS-NSSAI)) OF
SliceMappingInfo
SliceMappingInfo {
    s-nssai       S-NSSAI,
    freqBandInfoList   ::=   SEQUENCE
    (SIZE   (1..maxNrofSliceBands)) OF
FreqBandIndicatorNR
}
```

For example, table 11 shows an example of the network slice included in a SIB as an S-NSSAI-List. For example, the one or more network slice information and the associated one or more radio resources information may be included in a SIB, as follows.

TABLE 11

```
DRB-ToAddMod ::=              SEQUENCE {
    cnAssociation                CHOICE {
        eps-BearerIdentity          INTEGER (0..15),
        sdap-Config                 SDAP-Config
}                                OPTIONAL,     -- Cond DRBSetup
drb-Identity                    DRB-Identity,
S-NSSAI-List  SEQUENCE (SIZE (1..maxNrofS-NSSAI)) OF S-NSSAI
}
```

For example, table 12 shows an example of the network slice included in a SIB as an S-NSSAI-List. For example, the one or more network slice information and the associated one or more radio resources information may be included in a SIB, as follows.

TABLE 12

```
SDAP-Config ::=            SEQUENCE {
pdu-Session                    PDU-SessionID,
S-NSSAI-List   SEQUENCE (SIZE (1..maxNrofS-NSSAI)) OF S-NSSAI
}
```

Figure 14:
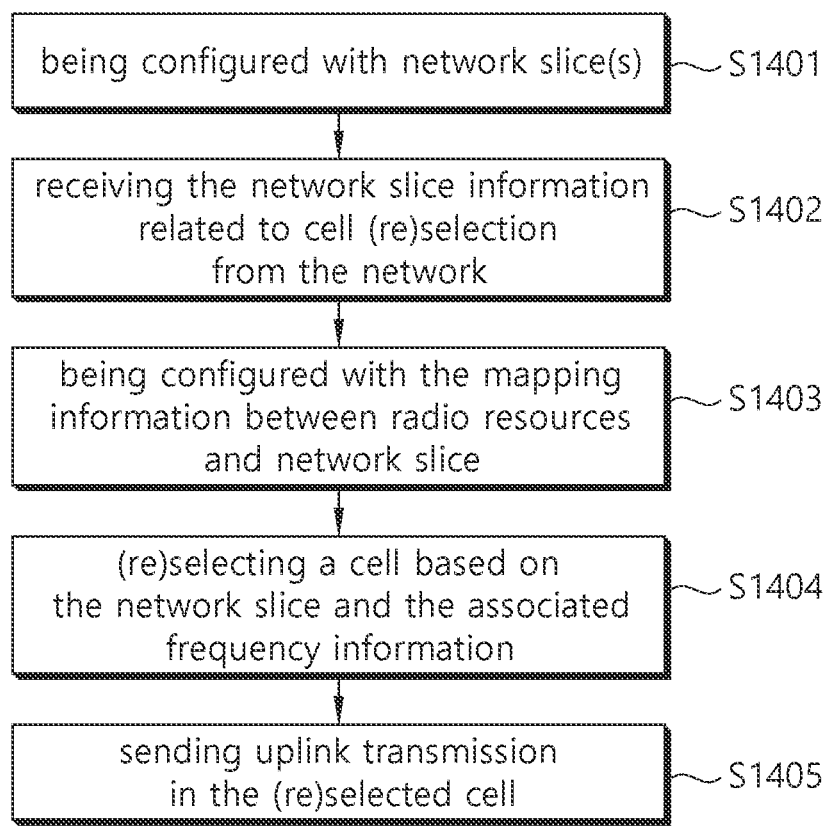
FIG. 14 shows an example of a method for a cell selection or a cell reselection considering a network slice in a wireless communication system, according to some embodiments of the present disclosure.

FIG. 14 shows an example of a method for a cell selection or a cell reselection considering a network slice in a wireless communication system, according to some embodiments of the present disclosure. In step S1401, the UE may be configured with network slice(s).

For example, the configured network slice(s) may be (pre-)configured based on the network slice configuration received from the network.

For example, the configured network slice(s) may be (pre-)configured based on configured NSSAI. The UE may be allowed to use the configured network slice(s) and/or configured NSSAI based on the UE subscription policy and/or the network configuration.

For example, the UE configured with NSSAI may be updated with the allowed NSSAI from the network via dedicated NAS (for example, Registration accept, UE Configuration Update command) and/or RRC (for example, RRCReconfiguration, RRCRelease) signalling.

For example, the network slice may be identified by RAN specific value, and the RAN node may have the mapping information between RAN specific slice identity and S-NSSAI.

In step S1402, the UE may receive the network slice information related to cell (re)selection from the network.

According to some embodiments of the present disclosure, the UE may acquire supported network slice information in the cell.

For example, the supported network slice information may indicate the allowed network slice in the cell and/or in the neighbour cells.

For example, the supported network slice information may be configured in the plmn-IdentityInfoList including plmn-IdentityList, trackingAreaCode (if available), ranAreaCode (if available) and cellIdentity. In this case, the supported network slice information may be provide per PLMN.

For example, the cell may send the allowed network slice to the UE in the cell and/or in the neighbour cells via system information message (for example, SIB1) or dedicated NAS or RRC signalling. Based on the supported network slice information, the network slice configuration in the UE may be updated or remapped.

For example, the UE may consider the allowed network slice information for the cell access.

According to some embodiments of the present disclosure, the UE may acquire the network slice information related to cell (re)selection with at least one of the intra-frequency, inter-frequency, or inter-RAT cell reselection information via system information (for example, SIB2 to SIB5).

For example, the network slice information may be configured in the frequencyBandList (for example, in SIB2 and/or SIB4). The network slice information may be configured with freqBandIndicator or carrierFreqList of a particular RAT.

For example, the network slice information may be associated with frequency information for cell (re)selection. Based on the network slice information, the UE could know which frequency is associated with and/or provide a particular network slice.

According to some embodiments of the present disclosure, based on the network slice information related to cell (re)selection associated with frequency information, the UE may perform network slice based cell (re)selection.

For example, the network may configure a range to decide a best cell (for example, rangeToBestCell) for network slice based cell (re)selection.

For example, the UE may not consider the network slice based cell (re)selection if the mobility state of the UE is higher than a mobility state threshold. The mobility state threshold may be configured by the network. For example, if the UE is High-mobility state, the UE may not consider the network slice based cell (re)selection.

For example, the UE may perform relaxed measurement for the frequency which does not support the network slice configured in the UE.

For example, the cell (re)selection parameters may include a cell quality threshold to decide a cell quality. The UE may not (re)select a cell although the cell supports all the network slices configured in the UE unless the cell quality is higher than the cell quality threshold.

For example, the UE may receive the indication that the network slice is unavailable for a certain period of time. If the UE receives this indication, the UE may perform only frequency and cell quality based cell (re)selection (for example, legacy cell (re)selection) for the certain period of time. The UE may suspend and/or delay the network slice based cell (re)selection for the certain period of time.

In step S1403, the UE may be configured with the mapping information between radio resources and network slice.

For example, radio resources may be configured in the unit of cell group (for example, SpCellConfig, SCellConfig, CellGroupConfig), PDU session (for example, Registration accept, UE configuration update command), radio bearer (for example, radioBearerConfig), logical channel and/or BWP via broadcast or dedicated signalling (for example, RRCReconfiguration).

For example, the mapping information between radio resources and the network slice may be preconfigured in the UE. For example, the network may provide the remapping information between radio resources and network slices via broadcast (for example, SIB, paging) and/or dedicated signalling (for example, RRCReconfiguration, UE configuration update command, Registration update).

For example, the network slice supporting a particular service (for example, per Data Network Name (DNN), Access Point Name (APN)) may be preconfigured in the UE.

In step S1404, the UE may (re)select a cell based on the network slice and the associated frequency information.

According to some embodiments of the present disclosure, the UE may first consider only the frequency supporting the configured network slice in the UE although the frequency is not included in the cell (re)selection candidates received from the network.

For example, the UE may search for a cell having the best cell quality and (re)select the cell, if the frequency on which the cell operates supports the configured network slice.

For example, the UE may search for a cell having good quality higher than the cell quality threshold, if the frequency on which the cell operates supports the configured network slice. As soon as the UE finds the cell, the UE may (re)select the cell.

For example, if the UE is configured with multiple network slices, the UE may consider the frequencies that support at least one configured network slice among the multiple network slices in the UE, if frequency supporting all the configured network slices does not exist, or the cell quality is not good enough to provide service although the cell supports all the configured network slices.

According to some embodiments of the present disclosure, in RRC_INACTIVE, the UE may first consider only the frequency supporting all the preferred network slice(s) prior to considering the configured network slice in the UE.

According to some embodiments of the present disclosure, the UE may consider the frequency supporting the configured network slice in the UE as the highest reselection priority.

According to some embodiments of the present disclosure, if cell does not provide the all configured network slice(s) in the UE, the UE may (re)select a cell supporting the configured network slices as many as possible (for example, a cell supporting the maximum number of configured network slices).

According to some embodiments of the present disclosure, if cell does not provide any configured network slice in the UE, the UE may (re)select a cell based on only frequency and the cell quality (for example, legacy cell (re)selection).

According to some embodiments of the present disclosure, the UE may delete the received network slice information, (for example, the UE receives cell selection information (for example, deprioritisationReq, redirectedCarrierInfo, cellReselectionPriorities) via dedicated signalling, or if the UE performs PLMN selection or NPN selection on request by upper layers.

In step S1405, the UE may send uplink transmission in the (re)selected cell.

According to some embodiments of the present disclosure, a UE may configuring one or more network slice(s). The UE may receive frequency information for cell (re) selection. The frequency information for cell (re)selection may be associated with network slice information for cell (re)selection. The UE may identify one or more frequencies that support at least one network slice from among the one or more network slice(s) based on the frequency information and the network slice information. The UE may (Re)select a cell on the identified one or more frequencies. The UE may Perform uplink transmission in the (re)selected cell.

Figure 15:
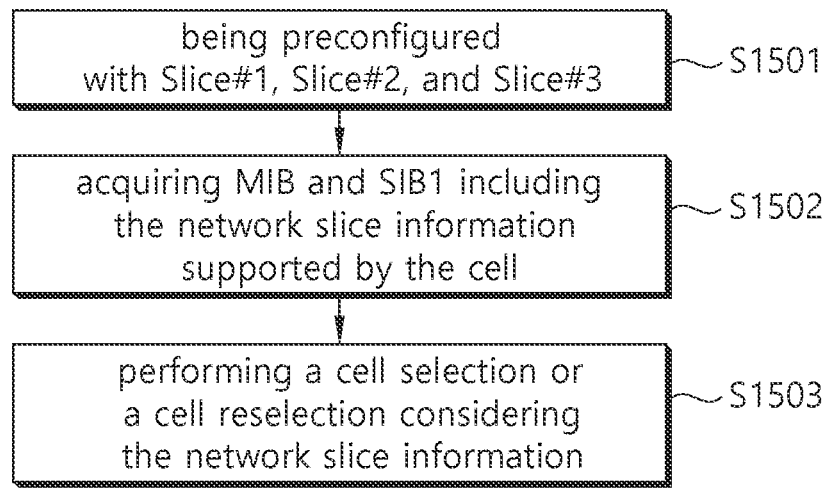
FIG. 15 shows an example of a scenario for a cell selection or a cell reselection considering a network slice in a wireless communication system, according to some embodiments of the present disclosure.

FIG. 15 shows an example of a scenario for a cell selection or a cell reselection considering a network slice in a wireless communication system, according to some embodiments of the present disclosure. For example, a scenario in FIG. 12 may be referred.

In step S1501, the UE may be preconfigured with Slice #1, Slice #2, and Slice #3.

In step S1502, the UE may acquire MIB and SIB1 including the network slice information supported by the cell.

In step S1503, the UE may perform a cell selection or a cell reselection considering the network slice information.

For example, the UE may consider the cell as barred, if the cell does not support any of Slice #1, Slice #2, and Slice #3.

For example, the UE may (re)select a cell, if the cell supports any of Slice #1, Slice #2 or Slice #3.

Figure 16:
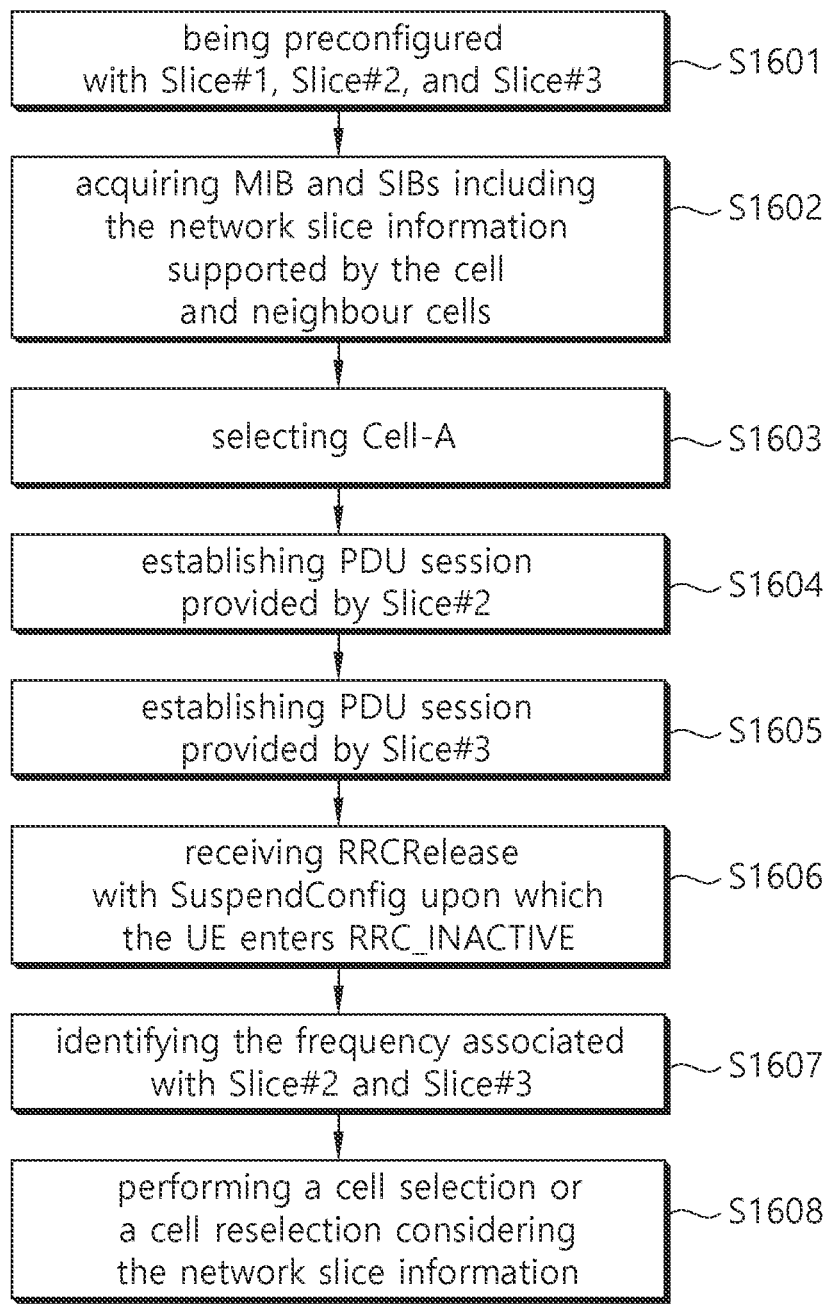
FIG. 16 shows an example of a scenario for a cell selection or a cell reselection considering a network slice in a wireless communication system, according to some embodiments of the present disclosure.

FIG. 16 shows an example of a scenario for a cell selection or a cell reselection considering a network slice in a wireless communication system, according to some embodiments of the present disclosure. For example, a scenario in FIG. 12 may be referred.

In step S1601, the UE may be preconfigured with Slice #1. Slice #2, and Slice #3.

In step S1602, the UE may acquire MIB and SIBs including the network slice information supported by the cell and neighbour cells.

In step S1603, the UE may select Cell-A For example, the UE may camp on Cell-A.

In step S1604, the UE may establish PDU session provided by Slice #2.

In step S1605, the UE may establish PDU session provided by Slice #3.

In step S1606, the UE may receive RRCRelease with SuspendConfig upon which the UE enters RRC_INACTIVE.

In step S1607, the UE may identify the frequency associated with Slice #2 and Slice #3.

In step S1608, the UE may perform a cell selection or a cell reselection considering the network slice information.

For example, the UE may (re)select a cell if (i) the cell supports both Slice #2 and Slice #3 and (ii) the cell quality is higher than threshold.

For example, if no cell supports both Slice #2 and Slice #3, the UE may (re)select a cell if the cell supports any of Slice #2 and Slice #3.

For example, if no cell supports any of Slice #2 and Slice #3, the UE may perform a legacy cell selection procedure not considering network slice information.

Hereinafter, an apparatus for a cell selection or a cell reselection considering a network slice in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to configure multiple network slices. The processor 102 may be configured to control the transceiver 106 to receive a network slice information related to the multiple network slices. The network slice information may inform at least one of network slices supported by each frequency among the multiple network slices. The processor 102 may be configured to establish a PDU session for a specific service. The PDU session may use at least one network slice. The processor 102 may be configured to determine one or more frequencies that support the at least one network slice, used by the PDU session, from among the multiple network slices based on the frequency information. The processor 102 may be configured to perform a cell selection procedure and/or a cell reselection procedure based on the determined one or more frequencies.

For example, one or more of the multiple network slices may be identified by a network slice identity determined by a RAN node.

For example, each of the multiple network slices may be identified by one or more of Single Network Slice Selection Assistance informations (S-NSSAIs).

For example, the network slice information may be included in a system information block broadcasted from a network and/or a dedicated signalling transmitted from a network.

For example, in the cell selection procedure and/or the cell reselection procedure, the processor 102 may be configured to assign a highest priority to a specific frequency that supports the at least one network slice used by the PDU session.

For example, in the cell selection procedure and/or the cell reselection procedure, the processor 102 may be configured to bar a specific frequency which does not support the at least one network slice used by the PDU session.

For example, in the cell selection procedure and/or the cell reselection procedure, the processor 102 may be configured to select a cell on the determined one or more frequencies.

For example, in the cell selection procedure and/or the cell reselection procedure includes, the processor 102 may be configured to select a cell that supports a maximum number of the at least one network slice used by the PDU session.

According to some embodiments of the present disclosure, the network slice information may include an information on a validity area, where the network slice information is valid. The information on the validity area may include information on (i) one or more cells, (ii) one or more RAN areas, (iii) one or more tracking areas, and/or (iv) one or more geographical areas.

According to some embodiments of the present disclosure, the processor 102 may be configured to control the transceiver 106 to receive a time information informing that the at least one network slice used by the PDU session is unavailable for a certain time period. The processor 102 may be configured to suspend the cell selection procedure and/or the cell reselection procedure for the certain time period.

According to some embodiments of the present disclosure, the processor 102 may be configured to control the transceiver 106 to receive the specific service via a selected cell from the cell selection procedure and/or the cell reselection procedure.

According to some embodiments of the present disclosure, the processor 102 may be configured to be in communication with at least one of a user equipment, a network, or an autonomous vehicle other than the wireless device.

Hereinafter, a processor for a wireless device for a cell selection or a cell reselection considering a network slice in a wireless communication system, according to some embodiments of the present disclosure, will be described.

The processor may be configured to control the wireless device to configure multiple network slices. The processor may be configured to control the wireless device to receive a network slice information related to the multiple network slices. The network slice information may inform at least one of network slices supported by each frequency among the multiple network slices. The processor may be configured to control the wireless device to establish a PDU session for a specific service. The PDU session may use at least one network slice. The processor may be configured to control the wireless device to determine one or more frequencies that support the at least one network slice, used by the PDU session, from among the multiple network slices based on the frequency information. The processor may be configured to control the wireless device to perform a cell selection procedure and/or a cell reselection procedure based on the determined one or more frequencies.

For example, one or more of the multiple network slices may be identified by a network slice identity determined by a RAN node.

For example, each of the multiple network slices may be identified by one or more of Single Network Slice Selection Assistance informations (S-NSSAIs).

For example, the network slice information may be included in a system information block broadcasted from a network and/or a dedicated signalling transmitted from a network.

For example, in the cell selection procedure and/or the cell reselection procedure, the processor may be configured to control the wireless device to assign a highest priority to a specific frequency that supports the at least one network slice used by the PDU session.

For example, in the cell selection procedure and/or the cell reselection procedure, the processor may be configured to control the wireless device to bar a specific frequency which does not support the at least one network slice used by the PDU session.

For example, in the cell selection procedure and/or the cell reselection procedure, the processor may be configured to control the wireless device to select a cell on the determined one or more frequencies.

For example, in the cell selection procedure and/or the cell reselection procedure includes, the processor may be configured to control the wireless device to select a cell that supports a maximum number of the at least one network slice used by the PDU session.

According to some embodiments of the present disclosure, the network slice information may include an information on a validity area, where the network slice information is valid. The information on the validity area may include information on (i) one or more cells, (ii) one or more RAN areas, (iii) one or more tracking areas, and/or (iv) one or more geographical areas.

According to some embodiments of the present disclosure, the processor may be configured to control the wireless device to receive a time information informing that the at least one network slice used by the PDU session is unavailable for a certain time period. The processor may be configured to control the wireless device to suspend the cell selection procedure and/or the cell reselection procedure for the certain time period.

According to some embodiments of the present disclosure, the processor may be configured to control the wireless device to receive the specific service via a selected cell from the cell selection procedure and/or the cell reselection procedure.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for a cell selection or a cell reselection considering a network slice in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to configure multiple network slices. The stored a plurality of instructions may cause the wireless device to receive a network slice information related to the multiple network slices. The network slice information may inform at least one of network slices supported by each frequency among the multiple network slices. The stored a plurality of instructions may cause the wireless device to establish a PDU session for a specific service. The PDU session may use at least one network slice. The stored a plurality of instructions may cause the wireless device to determine one or more frequencies that support the at least one network slice, used by the PDU session, from among the multiple network slices based on the frequency information. The stored a plurality of instructions may cause the wireless device to perform a cell selection procedure and/or a cell reselection procedure based on the determined one or more frequencies.

For example, one or more of the multiple network slices may be identified by a network slice identity determined by a RAN node.

For example, each of the multiple network slices may be identified by one or more of Single Network Slice Selection Assistance informations (S-NSSAIs).

For example, the network slice information may be included in a system information block broadcasted from a network and/or a dedicated signalling transmitted from a network.

For example, in the cell selection procedure and/or the cell reselection procedure, the stored a plurality of instructions may cause the wireless device to assign a highest priority to a specific frequency that supports the at least one network slice used by the PDU session.

For example, in the cell selection procedure and/or the cell reselection procedure, the stored a plurality of instructions may cause the wireless device to bar a specific frequency which does not support the at least one network slice used by the PDU session.

For example, in the cell selection procedure and/or the cell reselection procedure, the stored a plurality of instructions may cause the wireless device to select a cell on the determined one or more frequencies.

For example, in the cell selection procedure and/or the cell reselection procedure includes, the stored a plurality of instructions may cause the wireless device to select a cell that supports a maximum number of the at least one network slice used by the PDU session.

According to some embodiments of the present disclosure, the network slice information may include an information on a validity area, where the network slice information is valid. The information on the validity area may include information on (i) one or more cells, (ii) one or more RAN areas, (iii) one or more tracking areas, and/or (iv) one or more geographical areas.

According to some embodiments of the present disclosure, the stored a plurality of instructions may cause the wireless device to receive a time information informing that the at least one network slice used by the PDU session is unavailable for a certain time period. The stored a plurality of instructions may cause the wireless device to suspend the cell selection procedure and/or the cell reselection procedure for the certain time period.

According to some embodiments of the present disclosure, the stored a plurality of instructions may cause the wireless device to receive the specific service via a selected cell from the cell selection procedure and/or the cell reselection procedure.

According to some embodiments of the present disclosure, the stored a plurality of instructions may cause the wireless device to be in communication with at least one of a user equipment, a network, or an autonomous vehicle other than the wireless device.

Hereinafter, a method for a cell selection or a cell reselection considering a network slice performed by a base station (BS) in a wireless communication system, according to some embodiments of the present disclosure, will be described.

The BS may transmit, to a wireless device, a network slice configuration related to multiple network slices. The BS may transmit, to the wireless device, a network slice information related to the multiple network slices. The network slice information may inform at least one of network slices supported by each frequency among the multiple network slices. The BS may establish a PDU session for a specific service. The PDU session may use at least one network slice. The BS may receive, from the wireless device, a Radio Resource Control (RRC) message via a cell on a frequency which supports the at least one network slice used by the PDU session.

Hereinafter, a base station (BS) for a cell selection or a cell reselection considering a network slice in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, a network slice configuration related to multiple network slices. The processor may be configured to control the transceiver to transmit, to the wireless device, a network slice information related to the multiple network slices. The network slice information may inform at least one of network slices supported by each frequency among the multiple network slices. The processor may be configured to establish a PDU session for a specific service. The PDU session may use at least one network slice. The processor may be configured to control the transceiver to receive, from the wireless device, a Radio Resource Control (RRC) message via a cell on a frequency which supports the at least one network slice used by the PDU session.

The present disclosure can have various advantageous effects.

According to some embodiments of the present disclosure, a wireless device could efficiently perform a cell reselection considering a network slice.

For example, a wireless device could (re)select a cell supporting the network slice (for example, the network slice configured in the UE and/or the network slice preferred by the UE) regardless of frequency information for cell selection from the network For example, a wireless device could continuously provide a service for a particular network slice, by (re)selecting a cell supporting the particular network slice.

For example, a wireless device could provide fast access to the network for a service, by (re)selecting a cell supporting the particular network slice.

According to some embodiments of the present disclosure, a wireless communication system could efficiently provide a solution for service continuity by considering a network slice.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method, comprising:
   receiving, by a wireless device, a configuration for multiple network slices;
   receiving, by the wireless device, network slice information related to the multiple network slices, wherein the network slice information informs at least one of network slices supported by each frequency among the multiple network slices;
   establishing, by the wireless device, a PDU session for a specific service, wherein the PDU session uses at least one network slice;
   receiving, by the wireless device, time information informing that the at least one network slice used by the PDU session is unavailable for a certain time period;
   determining, by the wireless device, one or more frequencies that support the at least one network slice, used by the PDU session, from among the multiple network slices based on the frequency information;
   initiating, by the wireless device, a cell selection procedure and/or a cell reselection procedure based on the time information, while in RRC_INACTIVE state;
   barring, by the wireless device, at least one frequency which does not support the at least one network slice used by the PDU session; and
   selecting, by the wireless device, a cell among one or more cells which support maximum number of network slices among the at least one network slice used by the PDU session.

2. The method of claim 1, wherein one or more of the multiple network slices are identified by a network slice identity determined by a RAN node.

3. The method of claim 1, wherein each of the multiple network slices is identified by one or more of Single Network Slice Selection Assistance informations (S-NSSAIs).

4. The method of claim 1, wherein the network slice information is included in a system information block broadcasted from a network and/or a dedicated signalling transmitted from a network.

5. The method of claim 1, wherein the network slice information includes an information on a validity area, where the network slice information is valid.

6. The method of claim 5, wherein the information on the validity area includes information on (i) one or more cells, (ii) one or more RAN areas, (iii) one or more tracking areas, and/or (iv) one or more geographical areas.

7. The method of claim 1, wherein the method further comprises,
   suspending the cell selection procedure and/or the cell reselection procedure for the certain time period.

8. The method of claim 1, wherein the cell selection procedure and/or the cell reselection procedure includes,
   assigning a highest priority to a specific frequency that supports the at least one network slice used by the PDU session.

9. The method of claim 1, wherein the method further comprises,
   receiving the specific service via a selected cell from the cell selection procedure and/or the cell reselection procedure.

10. The method of claim 1, wherein the wireless device is in communication with at least one of a user equipment, a network, or an autonomous vehicle other than the wireless device.

11. A wireless device, comprising:
    a transceiver;
    a memory; and
    at least one processor operatively coupled to the transceiver and the memory, and adapted to perform operations, the operations comprising:
    receiving a configuration for multiple network slices;
    receiving network slice information related to the multiple network slices, wherein the network slice information informs at least one of network slices supported by each frequency among the multiple network slices;
    establishing a PDU session for a specific service, wherein the PDU session uses at least one network slice;
    receiving time information informing that the at least one network slice used by the PDU session is unavailable for a certain time period;
    determining one or more frequencies that support the at least one network slice, used by the PDU session, from among the multiple network slices based on the frequency information;

initiating a cell selection procedure and/or a cell reselection procedure based on the time information, while in RRC_INACTIVE state;

barring at least one frequency which does not support the at least one network slice used by the PDU session; and selecting a cell among one or more cells which support maximum number of network slices among the at least one network slice used by the PDU session.

12. The wireless device of claim 11, wherein one or more of the multiple network slices are identified by a network slice identity determined by a RAN node.

13. The wireless device of claim 11, wherein each of the multiple network slices is identified by one or more of Single Network Slice Selection Assistance informations (S-NS-SAIs).

14. The wireless device of claim 11, wherein the network slice information is included in a system information block broadcasted from a network and/or a dedicated signalling transmitted from a network.

15. The wireless device of claim 11, wherein the network slice information includes an information on a validity area, where the network slice information is valid.

* * * * *